[72] Inventor de Lamar I. Bell, Jr.
Dallas, Tex.
[21] Appl. No. 705,196
[22] Filed Feb. 13, 1968
[45] Patented Mar. 30, 1971
[73] Assignee Texas Instruments Incorporated
Dallas, Tex.

[54] ACOUSTO-OPTICAL MODULATOR
5 Claims, 4 Drawing Figs.
[52] U.S. Cl. .................................... 350/161, 350/162
[51] Int. Cl. .................................... G01f 1/32
[50] Field of Search ............................. 350/160, 161, 162; 332/7.51; 178/7.6

[56] References Cited
UNITED STATES PATENTS
3,424,906 1/1969 Korpel ........................ 350/161X OTHER REFERENCES
Korpel et al.: Proc. IEEE, Vol. 54, pp. 1429—37, 37, Oct. 1966

*Primary Examiner*—Ronald L. Wibert
*Assistant Examiner*—Edward S. Bauer
*Attorney*—Samuel M. Mims, Jr., James O. Dixon, Andrew M. Hassell, Harold Levine, John E. Vandigriff, Rene E. Grossman and Richeads, Harris and Hubbard

ABSTRACT: A modulator including an array of electroacoustic transducers for generating and steering an acoustic wave front in a light transmissive body. The acoustic wave front propagates through the transmissive material at an angle approximately proportional to the frequency deviation from a center frequency of an electrical signal applied to the transducers. An acoustic delay means displaces every other electroacoustic transducer an acoustic one-half wavelength from the transmissive body to compensate for the phase inversion produced by the interconnecting arrangement of the transducers. This interconnecting arrangement produces an electrical phase shift between the signals applied to every other transducer in the array.

PATENTED MAR 30 1971 3,572,899

INVENTOR
DeLAMAR T. BELL, JR.

E. Mickey Hubbard
ATTORNEY

ACOUSTO-OPTICAL MODULATOR

This invention relates to a system for steering a sound beam, and more particularly relates to an acousto-optical modulator of the type employing a propagating acoustic wave front generated by an array of electroacoustic transducers.

One of the most effective means of modulating and deflecting light is by means of a steerable ultrasonic wave traveling in an appropriate light transmissive medium in accordance with Bragg angle diffraction principles. In such systems, the efficiency increases with the length of the light-sound interaction, that is, the longer the path a light wave travels while interacting with an acoustic wave the more efficiently the acoustic power is utilized. Unfortunately, the greater the light-sound interaction, the smaller the bandwidth of the acoustic wave which can be used for light modulation and still maintain the Bragg angle diffraction condition necessary for efficient modulation. A review of acousto-optical deflection principles is given by E. I. Gordon in Vol. 54 of the "Proceedings of the Institute of Electrical and Electronics Engineers," page 1391 et seq.

It is possible to maintain Bragg angle diffraction for a wide bandwidth over a long light-sound interaction path by dividing the interaction path into several sound waves arranged in series optically and individually controlling the phase difference between the several sound waves. In effect, this produces an advancing acoustic wave through the light transmissive body made up of a plurality of individual sound waves. By controlling the phase difference between the several sound waves, the angle of propagation of the acoustic wave varies. That is, a steerable acoustic wave front is generated.

A number of attempts have been made to increase the light-sound interaction length by dividing the interaction path into several sound waves. One such attempt is described by A. Korpel et al., in Vol. 54 of the "Proceedings of the Institute of Electrical and Electronic Engineers," page 1429 et seq., as a stair-step arrangement. Each transducer of the stair-step arrangement is physically displaced from the previous transducer by a distance equal to one-half the acoustic wavelength. For a light modulator having a four stair-step transducer arrangement, there will be a two wavelength separation between the first transducer and the last. In applications where very rapidly changing signals are used (pulse compression, psuedorandom or pulse codes, etc.), a two wavelength difference in the acoustic wave front is detrimental.

The fractional bandwidth through which a modulator can operate efficiently is controlled in some measure by the type of electroacoustic transducers used to produce the acoustic wave front. Both piezoelectric ceramics and semiconductor piezoelectric materials have been used. If piezoelectric ceramics having high electromechanical coupling coefficients are used, wide band performance can be obtained with transducer losses of only a few decibels at relatively high frequencies.

Semiconductor piezoelectric materials provide a variety of fabrication techniques for fundamental mode transducers at higher frequencies than ceramic transducers. The semiconductor transducer can readily be made in the form of thin plates of an insulating piezoelectric crystal, by depletion and diffusion layer, and evaporated film techniques. Although the depletion layer and diffusion layer transducers provide fundamental mode operation over desired frequency ranges, they must be bonded in some way to the diffraction cell material in order to propagate the generated ultrasonic wave front. However, where mechanical lapping and polishing techniques are required in the bonding process, the depletion and diffusion layer transducers are practically useless above 150 MHz.

An object of this invention is to provide an electroacoustic transducer array for frequency steering an acoustic wave front.

It is another object of this invention to provide an electroacoustic transducer array where alternate transducers are phase compensated.

An important object of this invention is to provide a light modulator having a relatively long light-sound interaction distance for enhanced modulating efficiency at a wide bandwidth.

Another object of this invention is to provide a light modulator capable of operating on very rapidly changing acoustic signals.

Still another object of this invention is to provide a wide band ultrasonic light modulator having evaporated electroacoustic transducing means.

In accordance with the present invention, the acoustic analogue of an electrical signal is constructed from segments of the original signal that are never more than one-half wavelength at the center frequency from each other. By comparison, in the previously referenced four element stair-step configuration, the difference can be two wavelengths. In more efficient configurations where 16 or more transducer elements are utilized, with the present invention the difference is still only one-half wavelength whereas with the stair-step arrangement there will be a difference of 8 or more wavelengths.

In this invention, a steerable acoustic wave front is generated by a plurality of electroacoustic transducers arranged to produce several sound waves in series optically. Alternate transducers in the array are displaced from the light transmissive medium by means of an acoustic delay material to compensate for phase displacement at a normal center frequency. The compensation is such that each individual sound wave generated by the transducer array is never more than one-half wavelength from each sound wave at the center frequency.

In a specific embodiment of the invention, an acousto-optical modulator comprises a light wave transmissive body adapted to transmit compressional waves to diffract a light wave incident thereon in accordance with the angle of propagation of an acoustic wave front. A plurality of electroacoustic transducers arranged optically in series at one end of the transmissive body respond to an applied electronic signal to excite said body with a series of propagating acoustic waves. Delay means associated with alternate transducers of said serial arrangement compensate for the phase inversion produced by the electrical excitation of the transducers.

In accordance with another aspect of this invention, the transducers, delay means, and metal contacts are fabricated using thin film techniques to produce an efficient, wide band acousto-optical modulator which operates at intermediate and high frequencies.

A more complete understanding of the invention and its advantages will be apparent from the specification and claims and from the accompanying drawings illustrative of the invention.

Referring to the drawings.

Figure 1:
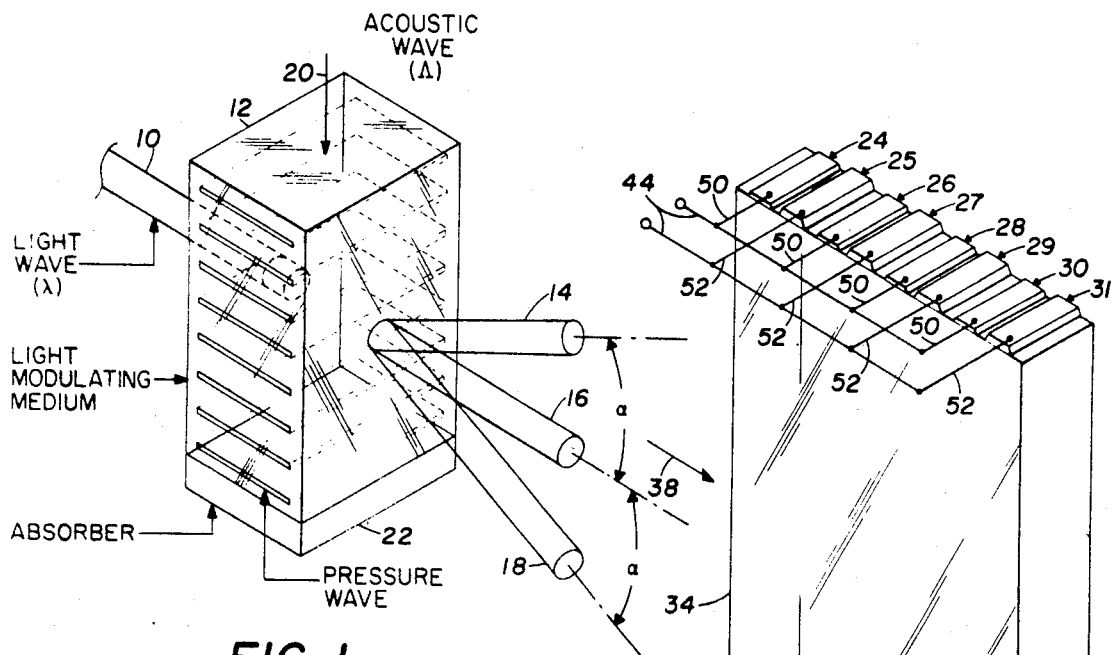
FIG. 1 shows diagrammatically an acousto-optical light modulator.

Referring to FIG. 1, a source of coherent monochromatic light, such as that derived from a helium-neon laser, generates a light beam 10 incident on one surface of a diffraction cell 12. The diffraction cell 12 is bounded by flat parallel sides through which the incident light beam 10 enters and the emerging light beams 14, 16, and 18 leave. The diffraction cell 12 is fabricated from a material that is optically transparent to the wavelength of light beam 10. Typically, the diffraction cell is a fused or crystal quartz material, but it may also be a transparent tank filled with a fluid such as water, or any other liquid or solid, such as a transparent ferroelectric material.

An acoustic wave 20 is introduced at one end of the cell 12 generally by means of an electroacoustic transducer. This acoustic signal sets up pressure waves (much finer than sketched in FIG. 1) in the cell which travel through the crystal and cause local periodic changes in the index of refraction. Planes in the light modulating material of the cell 12 through which the pressure waves travel are compressed and expanded to produce either a higher or lower index of refraction, respectively. When the collimated light beam 10 passes through the disturbed light modulating material, diffraction of the beam results. Similar results are obtained when acoustic shear waves are propagated through the cell, although the details of the interaction mechanism are somewhat different.

At the end of the diffraction cell 12 opposite the acoustic wave input there is an energy absorber 22. For a diffraction cell of fused silica, the absorber may be a lead based material or the like. This absorber prevents the propagating acoustic wave from being reflected back through the cell 12. Acoustic waves traveling through a light modulating medium have also been absorbed in a pool of mercury, in a rubber based material, or dispersed by rough or tilted surfaces.

Ultrasonic light modulators and their operation have been previously developed and usefully applied in optics as described by C. F. Quate, et al., in Vol. 53, of the "Proceedings of the Institute of Electrical and Electronics Engineers," page 1604 et seq. Basically, the incident light beam 10 is diffracted by the pressure waves traveling through the cell 12 in accordance with the Bragg law of diffraction.

Assume the path of the light beam 10 approximately parallels the advancing acoustic wave front represented by the pressure waves of FIG. 1, and that the optical path length through the cell 12 is shorter than the square of the acoustic wavelength over the light beam wavelength ($\Lambda^2/\lambda$). Then the incident light will be diffracted into either beam 14 or 18, separate and distinct from the transmitted beam 16, depending on the frequency shift produced by the advancing acoustic wave. It has been shown that the angle between the diffracted and undiffracted light beams is given by:

$$\sin \alpha = \lambda / \Lambda \quad (1)$$

where $\lambda$ equals the light beam wavelength, and $\Lambda$ the wavelength of sound traveling through the cell 12. If the optical length traveled by the beam 10 through the cell 12 is less than the square of the acoustic wavelength divided by the light beam wavelength ($\Lambda^2/\lambda$), and the acoustic energy is sufficiently high, then the light beam is split up into many orders in a manner similar to that of a diffraction grating.

Figure 2:
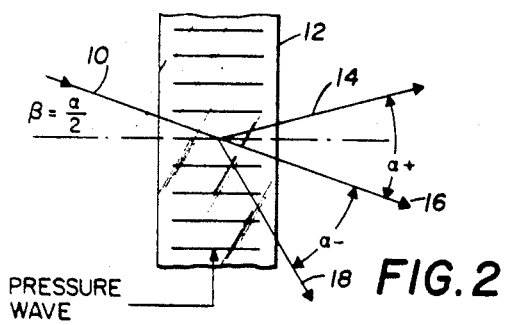
FIG. 2 illustrates schematically an acousto-optical light modulator where the entering light beam is incident at some angle relative to the advancing wave front.

In FIG. 1, the light beam 10 is illustrated as entering the cell 12 substantially parallel to the advancing acoustic wave front. However, as the optical path through the cell 12 increases, the angle between the light beam 10 and the plane waves of the sound beam becomes increasingly important. Referring to FIG. 2, the light beam 10 is illustrated as entering the cell 12 at an angle $\beta$ relative to the advancing plane waves. The maximum response occurs when this angle is one-half of the diffraction angle, that is, $\beta = \alpha/2$. When the optical path is much longer than $\Lambda^2/\lambda$, then the range of angles over which the incident light beam can vary from the optimum angle and still obtain significant modulation becomes small compared to the diffraction angle. This phenomena, because of its resemblance to Bragg reflection of X-rays by the parallel planes of a crystal lattice, is called acoustic Bragg reflection. Since the angle $\beta$ is normally fixed, it is the sound wavelength which is constrained to a narrow range of values with a consequently narrow signal bandwidth.

The optical path length for the beam 10 also determines the amount of acoustic power required to deflect a given percentage of the incoming light. The amount of acoustic power required to deflect the incoming light beam 10 has a direct bearing on the practicality of a light modulator. As established in the literature, A. Korpel et al., op. cit. and others, the efficiency of the acousto-optical modulator of FIG. 1 is given by the equation:

$$I_i/I_o = \sin^2(\Delta\Phi)^{1/2} \quad (2)$$

where $I_i$ equals the intensity of the light beam 10, $I_o$ equals the intensity of the diffracted light beam, and $\Delta\Phi$ is proportional to sound pressure. Mathematically, $\Delta\Phi$ is given by the expression:

$$\Delta\Phi = kl\Delta n \quad (3)$$

where $k$ is the light propagation constant, $l$ is the optical length traveled by the beam 10 through the sound beam 20, and $\Delta n$ equals the change in the refraction index, which is proportional to sound pressure. It can be shown that the power density in the acoustic beam is proportional to $(\Delta n)^2$ and the acoustic beam carries a power proportional to $l(\Delta n)^2$. Thus, improved efficiency and lower acoustic power consumption are possible with longer optical path lengths.

Various attempts have been made to increase the optical path length traveled by an incident light beam through a light modulator. However, merely increasing the cell dimension eventually causes the useful bandwidth of the advancing acoustic wave to decrease to an insignificant value. The reason is, as discussed above, that as the optical length increases, the range of angles over which Bragg reflection can take place becomes increasingly small. One way of maintaining efficient modulation is to effectively rotate the acoustic wave front as the frequency changes to maintain the Bragg angle relationship.

Figure 3:
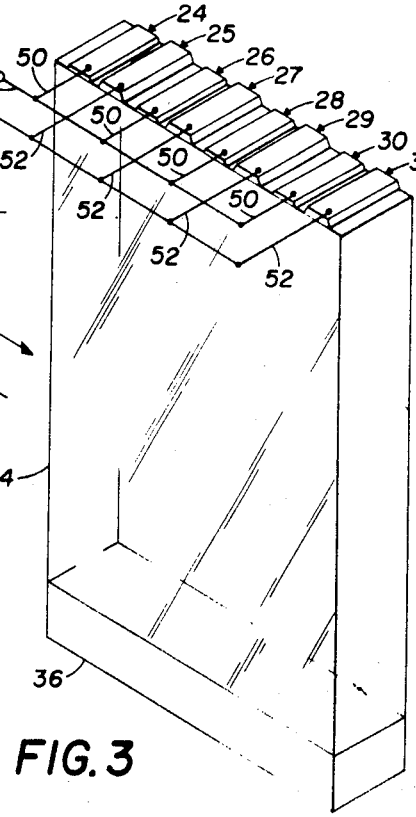
FIG. 3 is an isometric diagram of a multiple transducer acousto-optical light modulator in accordance with the present invention.

Referring to FIG. 3, there is shown an acousto-optical modulator wherein a plurality of piezoelectric transducers 24—31, arranged in series optically, are positioned at one end of a diffracting cell 34. Each transducer is driven separately and generates its individual acoustic wave which travels through the light modulating medium of the cell 34 as a series of compression or pressure waves. The ultrasonic wave can be longitudinal, shear, or mixed mode of propagation in which there is both a longitudinal and a shear component. The total of all the acoustic waves generated by the transducers 24—31 is a quasicontinuous wave front extending across the cell 34 traveling from the transducers to an absorber 36. A light beam 38 incident on one parallel face of the cell 34 is diffracted as it interacts with the moving wave front in a manner similar to that described with reference to FIGS. 1 and 2.

Figure 4:
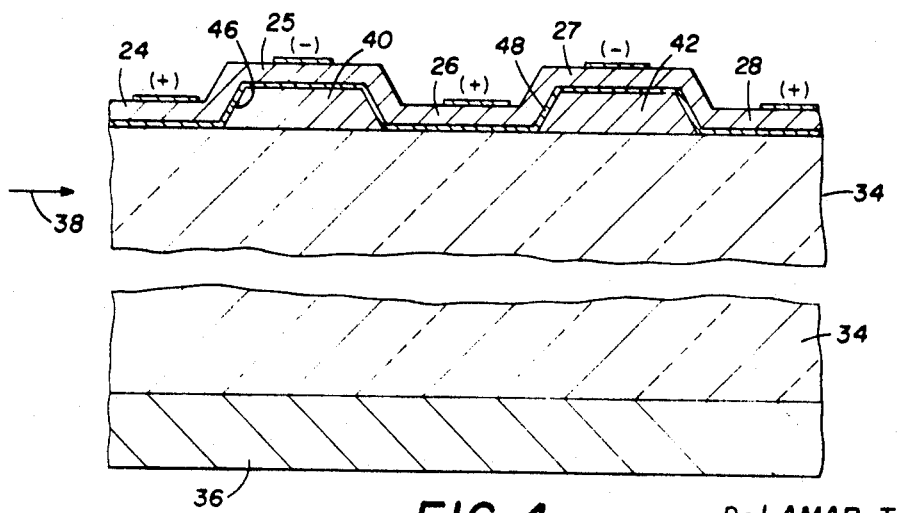
FIG. 4 is an enlarged view of a portion of the beam steering electroacoustic transducer array for the modulator of FIG. 3.

Referring to FIG. 4, there is shown an expanded portion of the cell 34 including the piezoelectric transducers 24—28. Adjacent transducers are driven in opposite phase as indicated by the polarity markings. Every other transducer in the array is displaced from the light modulating medium by means of an acoustic delay unit. For example, acoustic delay 40 separates the transducer 25 from the cell 34 and acoustic delay 42 separates the transducer 27 from the cell. For the transducer array shown in FIG. 3, the transducers 25, 27, 29, and 31 would be displaced by means of acoustic delay units. The height of the acoustic delay is so chosen that, at the center frequency $f_o$ of an electrical signal applied to the leads 44, the acoustic wave front generated by all the transducers working together will travel parallel to the ends of the cell 34. If the height is equal to $\Lambda/2$, then the phase inversion produced by the interconnecting arrangement is compensated. One advantage of the system shown is that the acoustic analogue of the electrical signal applied to leads 44 is constructed from segments of the original signal that are never more than one-half wavelength at the center frequency from each other.

If the frequency of the signal applied to leads 44 is changed by an amount $\Delta f$, the average (or far field) acoustic wave front travels through the cell 34 at a rotated angle approximately proportional to the frequency shift. By rotating the traveling acoustic wave front, Bragg reflection can be maintained for a longer optical path traversed by the light beam 38 through the cell 34. Such operation is described by A. Korpel, et al., op. cit.

An electrical phase shift of 180° has been assumed in the discussion not because it is the ideal but because it is the closest practical realization to the ideal. (Gordon, op. cit.). Similarly, the acoustic phase shifts introduced by the spacers well-known be 180° but are intended to compensate the electrical phase shift at band center and where possible optimize the sound beam angle away from band center.

Referring to FIG. 4, the acoustic delays 40 and 42 are formed on the diffraction cell 34. Then the entire upper surface of the cell 34 is plated with a metal film and etched to define the contacts 46 and 48. The acoustic delays are formed from either the material of contacts 46 and 48, from the same material as the light transmissive medium 34, or from the material used in the transducer elements to be described. If the transducer material is used, the forming process is somewhat simplified and a better impedance match will result.

Next an evaporated film of a piezoelectric material, such as cadmium sulfide, is deposited directly onto the metal film. Although cadmium sulfide is a preferred material for the transducers, other group II—VI semiconductors such as ZnO, ZnS, CdSe, CdTe, and ZnTe also exhibit acoustic transducer properties. A material which is superior to CdS in many respects is ZnO; however, this material is not now as readily evaporated with sufficient quality or reproducibility. Some ferroelectric materials, such as $LiNbO_3$, are also usable as evaporated thin film transducers. Still another important group of piezoelectric semiconductors are the III—V compounds, such as GaAs, InSb, GaP, and InAs. The cubic forms of several group II—VI semiconductors are also considered possible materials for the transducers.

The performance of a piezoelectric evaporated film transducer depends mainly upon the crystallographic orientation of the layer and the layer resistivity. If the layer resistivity is sufficiently high such that the shunting resistance across the transducer is large compared with its capacitive reactance, the transducer operates at its greatest efficiency. The resistivity of the piezoelectric material can be controlled by evaporation conditions or by a variety of postevaporation heat treatments.

The transducers are completed by depositing a back metal electrode onto the piezoelectric layer. The leads 44 are attached to the back electrode of the transducers 24—31 through jumper leads 50 and 52 as shown in FIG. 3. Other transducer interconnections which preserve the nominal 180° electrical phase shift between adjacent transducers are possible, including thin metal film connections buried under the thin film piezoelectric material.

Although thin film transducers have been described herein, the modulator of this invention will also operated with piezoelectric ceramic or crystalline transducers. These transducers have proven to operate with better efficiency than the thin film transducer but at lower frequencies. Their fabrication techniques are as well known as those for thin film transducers.

Although the invention has been described with reference to a light modulator, other applications are possible. For example, since the acoustic wave front propagates at an angle approximately proportional to the frequency of the applied electrical signal, the frequency of the applied signal can be determined by measuring the propagation angle of the acoustic wave. Such a device could be implemented by replacing the absorber 36 with proper phase sensitive apparatus.

While only preferred embodiments of the invention, together with modification thereof, have been described in detail herein and shown in the accompanying drawings, it will be evident that various further modifications are possible without departing from the scope of the invention.

I claim:

1. Apparatus for steering a sound wave by frequency variation, said sound wave propagating through an acoustic transmissive medium, comprising a plurality of electroacoustic transducers arranged geometrically in series at one end of said transmissive medium coupled to an electronic signal in a manner to produce a phase displacement between alternate transducers and excite said medium with a series of propagating acoustic waves, and acoustic delay means positioned between alternate transducers of said arrangement and said transmissive medium to compensate for the phase displacement between alternate transducers at the center frequency of the electronic signal to produce a flat planar acoustic wave at said center frequency.

2. Apparatus for steering a sound wave by frequency variation as set forth in claim 1 wherein the length of said delay means is equal to the phase difference between alternate transducers at the nominal center frequency of the pass band of the electronic signal.

3. Apparatus for steering a sound wave by frequency variation as set forth in claim 1 wherein said transducers and said delay means are formed from the same material to improve impedance matching.

4. Apparatus for steering a sound wave by frequency variation as set forth in claim 1 wherein said transmissive medium and said delay means are an optically transparent ferroelectric material.

5. Apparatus for steering a sound wave by frequency variation as set forth in claim 1 wherein said transmissive medium and said delay means are a high index glass.